D. E. BUTLER.
Cane-Stripper.
No. 43,178.    Patented June 21, 1864.
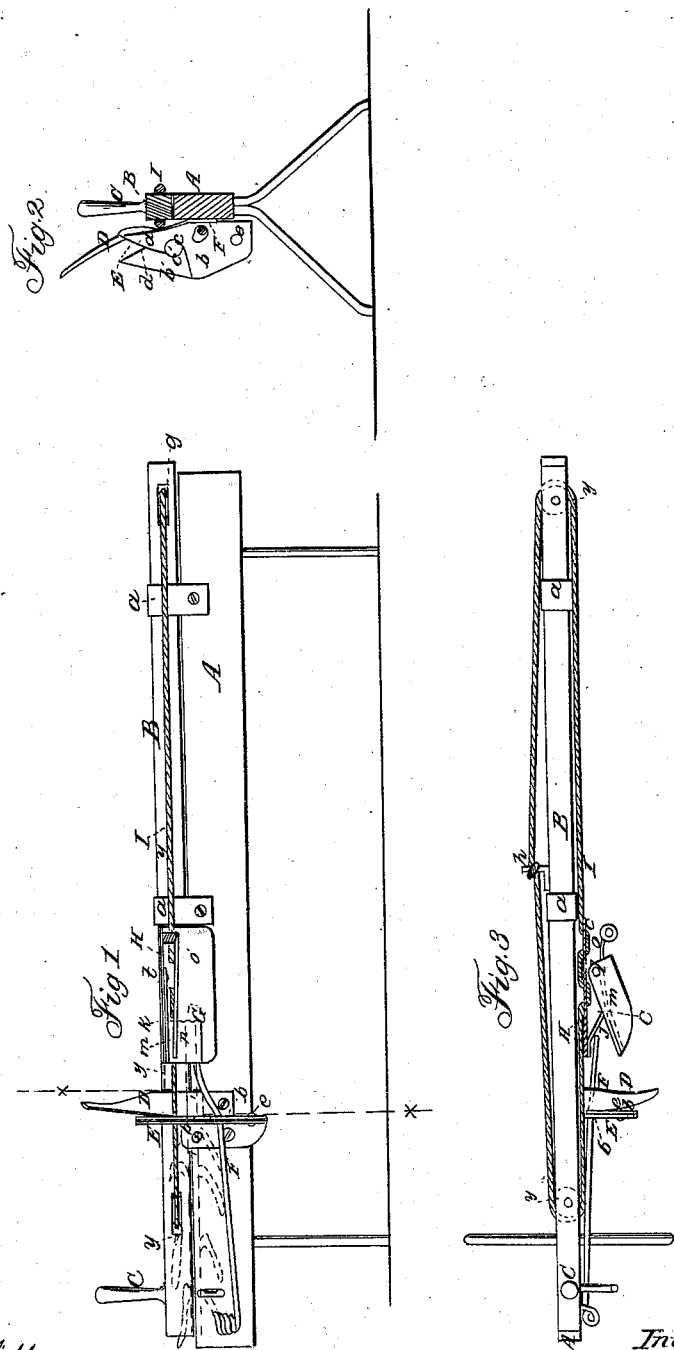
Witnesses:
C. L. Topliff
Geo. W. Reed
Inventor.
Derwin E. Butler
per Munn & Co
Attorneys

UNITED STATES PATENT OFFICE.

DERWIN E. BUTLER, OF CHESTERFIELD, OHIO.

MACHINE FOR STRIPPING LEAVES FROM SUGAR-CANE.

Specification forming part of Letters Patent No. 43,178, dated June 21, 1864.

*To all whom it may concern:*

Be it known that I, DERWIN E. BUTLER, of Chesterfield, in the county of Fulton and State of Ohio, have invented a new and Improved Machine for Stripping Leaves from Sugar-Cane; and I do hereby declare that the following is a full, clear, and exact description thereof, which will enable others skilled in the art to make and use the same, reference being had to the accompanying drawings, making a part of this specification, in which—

Figure 1 is a side view of my invention; Fig. 2, a transverse vertical section of the same, taken in the line $x\ x$, Fig. 1; Fig. 3, a plan or top view of the same, the top plate of the clamp being removed, as indicated by the line $y\ y$, Fig. 1.

Similar letters of reference indicate corresponding parts in the several figures.

This invention relates to a new and improved machine for stripping the leaves from the stalks of sugar-cane; and it consists in the employment or use of a stripper and a sliding clamp arranged to operate in the manner hereinafter set forth, whereby the work may be done very expeditiously and thoroughly.

A represents a horizontal bar, which is supported at a suitable height by legs on a proper framing, and B is a sliding bar placed on the stationary bar A, and fitted in suitable guides, $a\ a$, the sliding bar B being provided with a handle, C, for the convenience of operating it.

To one side of the stationary bar A (the right-hand side) there is attached a knife, D, which is curved outward from A at its upper cutting part, and to the same side of the bar A, just back of the knife D, there is attached a stripper, E, composed of two parts, $b\ b'$, one part, $b$, being secured to A and projecting out from it at right angles, and having a semicircular notch, $c$, made in its outer edge, the portion above the notch being rounded or beveled inward toward the bar A, as shown at $d$. (See Fig. 2.) The other part, $b'$, of the stripper is similar to $b$, it being provided with a semicircular notch, $c'$, and beveled above the notch outward from the bar A, as shown at $d'$. The part $b'$ is secured by a pivot, $e$, to the part $b$, and a spring, F, which is attached to the bar A, passes through the plate $b'$ and through a hole in the plate $b$, and has a tendency to keep the stripper in a closed state, so that the inner edge of $b'$ will be in contact with the bar A or the flange of $b$, and the two semicircular notches $c\ c'$ form a circular opening, as shown in Fig. 2.

G is a clamp constructed as follows: a plate, H, bent in right-angular form and connected to a cord, I, which passes around pulleys $g\ g$, in the front and back ends of the sliding bar B, and is attached to the bar A at $h$. To the vertical part $i$ of the plate H there is secured an oblique jaw, $j$, serrated at its outer edge, and to the under side of the horizontal part $k$ of the plate H there is attached by a pivot, $l$, a plate, $m$, having a jaw, $n$, which is kept in contact by a spring, $o$, with the jaw $j$.

The operation is as follows: A stalk of cane is grasped by the attendant and its head cut off by drawing it across the knife D, and the end is then shoved down between the two parts $b\ b'$ of the stripper, the projecting end of the stalk being fitted in the clamp G. The bar B is then shoved forward by the operator through the medium of the sliding bar B, which gives a quick movement to the clamp, and the stalk drawn through the stripper, which takes the leaves from the stalks, the latter being then removed and the clamp drawn back, the clamp, just before reaching the termination of its backward movement, coming in contact with the spring F and forcing out the part $b'$, so that it may receive the succeeding stalk.

Having thus described my invention, what I claim as new, and desire to secure by Letters Patent, is—

1. The stripper E, in combination with the clamp G, attached to the sliding bar B, and either with or without the knife D, all arranged to operate substantially as and for the purpose set forth.

2. The connecting of the clamp G to the bar B by means of the cord I, substantially as shown, for the purpose of giving a quick and long movement to the clamp under a slower and shorter movement of the bar, for the purpose specified.

DERWIN E. BUTLER.

Witnesses:
LEWIS M. THORP,
K. A. CARTER.